(12) United States Patent
Toyama et al.

(10) Patent No.: US 9,006,939 B2
(45) Date of Patent: Apr. 14, 2015

(54) WIRING HARNESS AND A METHOD OF PROVIDING WIRING STRUCTURE OF THE SAME

(75) Inventors: Eiichi Toyama, Shizuoka (JP); Shigemi Hashizawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 859 days.

(21) Appl. No.: 12/926,127

(22) Filed: Oct. 27, 2010

(65) Prior Publication Data

US 2011/0133548 A1    Jun. 9, 2011

(30) Foreign Application Priority Data

Dec. 7, 2009    (JP) .................................. 2009-277766

(51) Int. Cl.
*H01B 7/30*    (2006.01)
*B60R 16/02*    (2006.01)

(52) U.S. Cl.
CPC .................................. *B60R 16/0215* (2013.01)

(58) Field of Classification Search
USPC .......................................................... 307/147
See application file for complete search history.

(56) References Cited

U.S. PATENT DOCUMENTS

2006/0292923 A1* 12/2006 Tsukamoto .................... 439/501
2007/0243729 A1* 10/2007 Tsubaki et al. ............. 439/76.2
2009/0152034 A1*  6/2009 Takasaki et al. ............. 180/68.5

FOREIGN PATENT DOCUMENTS

| CN | 1034637 A | 8/1989 |
|---|---|---|
| CN | 101043108 A | 9/2007 |
| CN | 101286595 A | 10/2008 |
| JP | 2007-290616 A | 11/2007 |
| WO | WO-2008/137671 A1 | 11/2008 |

OTHER PUBLICATIONS

Office Action mailed Jan. 22, 2013, issued for the corresponding Chinese Patent Application No. 201010575774.9 and English translation thereof.
Office Action mailed Mar. 20, 2014 in connection with Chinese Application No. 201010575774.9.

* cited by examiner

*Primary Examiner* — Jared Fureman
*Assistant Examiner* — Duc M Pham
(74) *Attorney, Agent, or Firm* — Locke Lord LLP (57) ABSTRACT

A wiring arrangement of a wiring harness 41 at an underfloor 34 is finished by arranging a connecting member 43 to a position of a through-hole 35, by extending a sheath 48 on the underfloor 34 parallel to the underfloor 34 while the sheath 48 is received in a wire protect member 44, and by fixing a terminal fixing member 45 and the wire protecting member 44 to the underfloor 34. After such a wiring arrangement, the wiring harness 41 is electrically connected to a junction block 31 around the through-hole 35 by mounting a battery 25 or the like.

6 Claims, 4 Drawing Sheets

WIRING HARNESS AND A METHOD OF PROVIDING WIRING STRUCTURE OF THE SAME

CROSS REFERENCE TO RELATED APPLICATIONS

This application is on the basis of Japanese Patent Application No. 2009-277766, the contents of which are hereby incorporated by reference.

BACKGROUND OF THE INVENTION

1. Field of the Invention

The present invention relates to a wiring harness arranged on an underfloor at a ground side of a floor panel of a vehicle, and to a wiring structure of the wiring harness.

2. Description of the Related Art

A later-described Patent Document 1 discloses a wiring structure of a wiring harness used in a hybrid vehicle or an electric vehicle. Hereinafter an embodiment of the conventional wiring harness will be explained with reference to FIG. 4.

Figure 4:
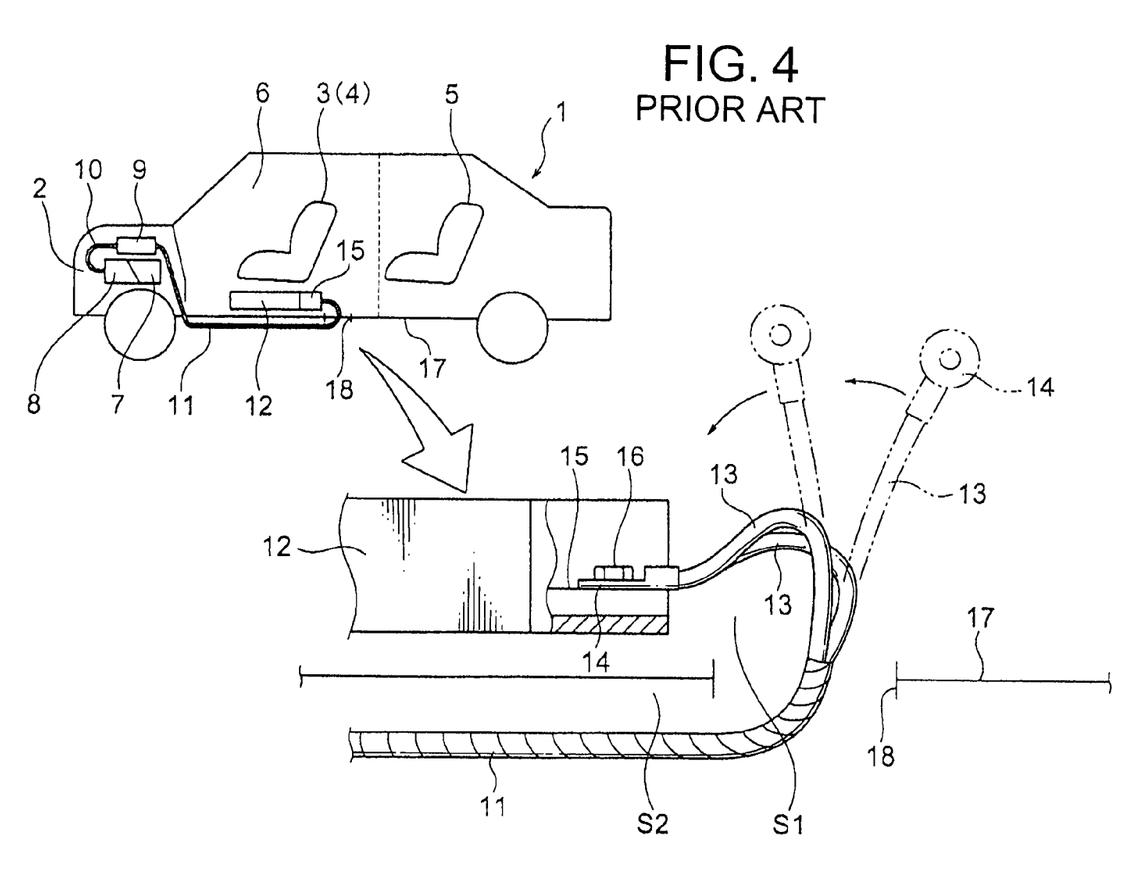
FIG. 4 is a schematic view of a conventional wiring structure of a wiring harness on a vehicle and a partially enlarged view of the same.

In FIG. 4, a hybrid vehicle 1 includes a cabin 6 having a driver's seat 3, an assistant driver's seat 4, and a rear seat 5 behind an engine room 2. An engine 7, a motor, 8, and an inverter 9 are mounted on an engine room 2. A motor cable 10 connects the motor 8 with the inverter 9. One end of a wiring harness 11 is connected to the inverter 9. The other end of the wiring harness 11 is connected to a battery 12 (battery pack) interposed between the driver's seat 3 and the assistant driver's seat 4 in the cabin 6.

The wiring harness 11 is composed of two high-voltage cables 13, and a terminal 14 is provided at an end of each high-voltage cable 13. The terminal 14 is fixed to a terminal block 15 provided at a rear of the battery 12 (or a junction block interposed between the terminal 14 and the battery 12) with a bolt 16. The wiring harness 11 is arranged on an underfloor at a ground side of a floor panel 17, and guided into the cabin 6 from a through-hole 18 of the floor panel 17. The through-hole 18 is open at a rear of the battery, and the wiring harness 11 guided into the cabin 6 is bent forward.

[Patent Document 1] JP, A, 2007-290616

According to the conventional technique, there is a problem that the workability of arranging the wiring harness 11 is decreased because it is necessary to sequentially operate to insert the other end of the wiring harness 11 into the through-hole 18 of the floor panel 17 and to bent the wiring harness 11 after the insertion of the wiring harness 11. Further, according to the conventional technique, because the high-voltage cable 13 composing the wiring harness 11 is thick, there is a problem that the bending operation is not easy.

Further, according to the conventional technique, because the wiring harness 11 is guided into the cabin 6, there is a problem that the whole length of the wiring harness 11 becomes long, and a cost of the wiring harness 11 is increased. Further, according to the conventional technique, because the wiring harness 11 is guided into the cabin 6, then bended forward, there is a problem that a space S1 for receiving the bending part is needed. To save the space S1 makes a problem that a foot space of a crew member sitting on the rear seat 5 becomes narrower.

Further, according to the conventional technique, when the thick wiring harness 11 which is hard to be bent is bent from the underfloor to the through-hole 18, the wiring harness 11 is separated away from the floor panel 17 at least near the through-hole 18, and a space S2 is generated at the underfloor side. Therefore, there is a problem that damage may occur because the wiring harness 11 is disposed close to the ground.

Further, according to the conventional technique, when the space S2 is made smaller, because the wiring harness 11 should be bent, the through-hole 18 of the floor panel 17 should be relatively larger. Therefore, there is a problem that a waterproof structure should be larger, and there is a problem that a cost of the larger waterproof structure is increased.

Accordingly, an object of the present invention is to provide a wiring harness and a method of providing a wiring structure of the wiring harness which is able to increase workability, save space, and reduce cost, and able to provide a low-profile arrangement.

SUMMARY OF THE INVENTION

In order to attain the object, according to the present invention, there is provided a method of providing a wiring structure of a wiring harness arranged on an underfloor at a ground side of a floor panel of a vehicle including the steps of:

providing a wiring harness having one or a plurality of high voltage cables, and a connecting member provided at one end of the high voltage cable and electrically connected to a mating object;

connectably forming the connecting member which is perpendicular to an extending direction of a cover of the high voltage cable at the one end;

forming a through-hole communicating an inside and an outside of the vehicle disposed at a specific position on the floor panel; then aligning the connecting member to a position of the through-hole; and arranging the cover at the one end parallel to the underfloor.

According to the above wiring structure of the wiring harness, there is no need to arrange the high voltage cable above the floor panel. Because the high voltage cable is not arranged above the floor panel, there is no need to bend the high voltage cable at the position of the through-hole, and the wiring structure can be farther away from the ground as much as possible. According to the present invention, because the end of the cover of the wiring harness is arranged parallel to the underfloor, the wiring structure allows the wiring harness sufficiently saves a distance from the ground. Further, because the high voltage cable is not arranged above the floor panel, there is no need to insert the wiring harness via the through-hole, and the whole length of the wiring harness can be reduced. According to the present invention, when the wiring harness is arranged at the underfloor, the connecting member of the wiring harness disposed at the position of the through-hole and the mating object on the floor panel in the cabin can be electrically connected to each other, thereby connecting workability is improved.

Preferably, the one or the plurality of high voltage cables are composed as shielded electric wires, or a shielding member covering the one or the plurality of high voltage cables in a lump is integrally formed at an outside of the one or the plurality of high voltage cables.

According to the present invention having such a feature, the shielded high voltage cables composing the wiring harness are arranged at the underfloor. Namely, the wiring harness for which it is unnecessary to have special shielding parts is arranged at the underfloor. According to the present invention, for a later-described wire protecting member, it is unnecessary to have a shielding function. The shielded wire includes a braided wire or a metal foil, and the shielding member preferably includes a braided wire or a metal foil.

Preferably, a specific shielding part of the one or the plurality of high voltage cables or the shielding member directly or indirectly provides a body earth with respect to the underfloor.

According to the present invention having such a feature, because there is no need to arrange the high voltage cable above the floor panel, it is easy to provide a body earth, and a shielding structure can be simplified.

Preferably, the wiring harness further includes a tubular wire protecting member receiving the one or the plurality of high voltage cables, and the wire protecting member is arranged along the underfloor and fixed.

According to the present invention having such a feature, the high voltage cables are arranged at the underfloor while being protected. Further, according to the present invention, when the high voltage cable is shielded, a structure of the wire protecting member can be simplified.

Preferably, the wiring harness is fixed watertightly to a periphery of the through-hole.

According to the present invention having such a feature, water is prevented from entering the floor panel via the through-hole. In the present invention, because there is no need to arrange the high voltage cable above the floor panel, the through-hole is relatively small. Therefore, a waterproof structure can be easily provided on the wiring harness. Further, a reliable waterproof structure can be provided without a complex structure.

According to another aspect of the present invention, there is provided a wiring harness arranged on an underfloor at a ground side of a floor panel of a vehicle including:

one or a plurality of high voltage cables; and a connecting member provided at one end of the high voltage cable and electrically connected to a mating object, wherein the connecting member is connectably formed perpendicular to an extending direction of a cover of the high voltage cable at the one end.

According to the present invention having such a feature, the wiring harness is suitable for realize the above wiring structure of the wiring harness. Namely, there is no need to arrange the high voltage cable above the floor panel when using this wiring harness.

These and other objects, features, and advantages of the present invention will become more apparent upon reading of the following detailed description along with the accompanied drawings.

DETAILED DESCRIPTION OF THE PREFERRED EMBODIMENTS

There is provided a wiring harness and a wiring structure of the same in which one or a plurality of high voltage cables are arranged not above a floor panel. The wiring harness disposed at the underfloor is arranged along the underfloor, namely, parallel to the underfloor.

First Embodiment

Figure 1:
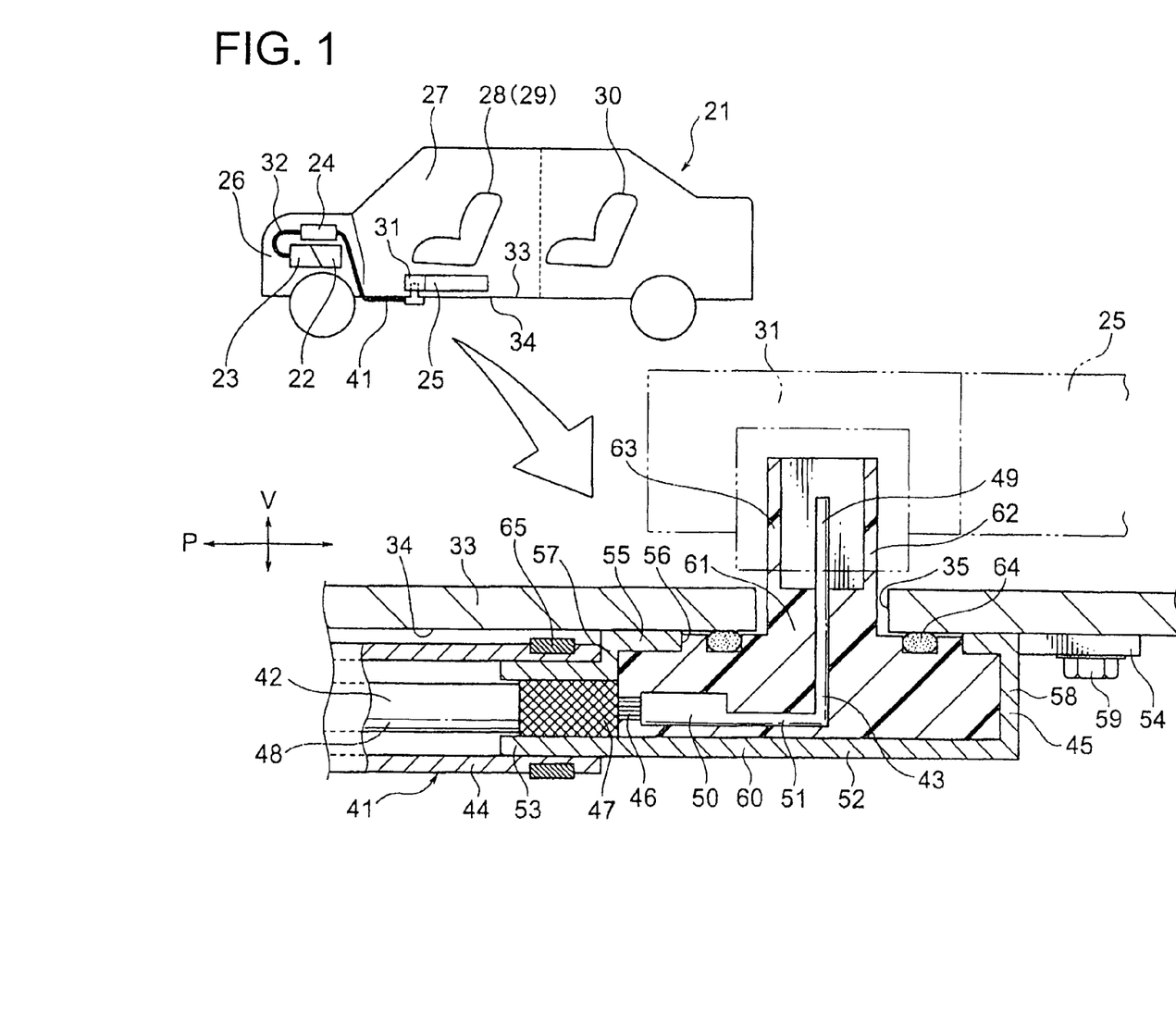
FIG. 1 is a schematic view showing a wiring harness and a wiring structure of the wiring harness on a vehicle according to a first embodiment of the present invention, and a partially enlarged view of the same.

Hereinafter, a first embodiment of the present invention will be explained with reference to figures. FIG. 1 is a schematic view showing a wiring harness and a wiring structure of the wiring harness on a vehicle according to a first embodiment of the present invention, and a partially enlarged view of the same.

The wiring harness of this embodiment is used in a hybrid vehicle or an electric vehicle. Hereinafter, the wiring harness is used in the hybrid vehicle. (When the wiring harness is used in the electric vehicle, the basic structure and effect are the same as the hybrid vehicle. Incidentally, the present invention can be used not only in the hybrid vehicle and the electric vehicle, but also in a normal vehicle.)

In FIG. 1, the reference sign 21 indicates the hybrid vehicle. The hybrid vehicle 21 is driven by a combination of an engine 22 and a motor 23. An electric power is supplied to the motor 23 via an inverter 24 from a battery 25 (battery pack). In this embodiment, the engine 22, the motor 23, and the inverter 24 are mounted on an engine room 26 on which front wheels are disposed. Further, the battery 25 is mounted on a cabin 27 disposed at a rear side of the engine room 26. A driver's seat 28, a front passenger's seat 29, and a rear seat 30 are provided in the cabin 27.

The battery 25 is interposed between the driver's seat 28 and the front passenger's seat 29. In this embodiment, a junction block 31 connected to the battery 25 is disposed at a front side of the battery 25.

The motor 23 and the inverter 24 are connected to each other with a motor cable 32. Further, the battery 25 and the inverter 24 are connected to each other with a wiring harness 41 according to the present invention. The wiring harness 41 is arranged from the engine room 26 to an underfloor 34 disposed at the ground side of a floor panel 33.

It is unnecessary to arrange the wiring harness 41 in the cabin 27 over the floor panel 33. In particular, a through-hole 35 is provided at a specific position on the floor panel 33, and it is unnecessary to insert a later-described high voltage cable 42 of the wiring harness 41 into the through-hole 35. The through-hole 35 is aligned to a position of the junction block 31.

Here, a supplemental explanation of this embodiment will be given. The motor 23 includes a motor unit and a generator unit. The inverter 24 includes an inverter unit and a converter unit. The inverter 24 is an inverter assembly and includes, for example, an air conditioner inverter, a generator inverter, and a motor inverter. The battery 25 is a battery module of Ni-MH, Li-ion or the like. Incidentally, a capacitor can be used instead of the battery. The battery 25 is not limited, as long as it can be used in the hybrid vehicle 21 or an electric vehicle.

As described above, the wiring harness 41 is arranged from the engine room 26 to the underfloor 34, and has a feature of arranging at the underfloor 34. The wiring harness 41 includes: one or a plurality of high voltage cables 42; a connecting member 43 provided at one end of the high voltage cable 42 and electrically connected to the junction block 31 (mating object); a wire protecting member 44 for receiving and protecting the high voltage cables 42 in a lump; and a terminal fixing member 45 made of conductive metal.

In this embodiment, two high voltage cables are provided (incidentally, a low voltage cable may be included), and arranged in a direction perpendicular to a plane of FIG. 1 (arranged along the underfloor 34). The high voltage cable 42 is a thick electric wire and a conductor disposed at the center of the high voltage cable 42 is made of copper, copper alloy, or aluminum. The high voltage cable 42 is a shielded wire having a shield function and composed of a conductive center conductor 46, an insulator (not shown) disposed at an outside of the center conductor 46, a shielding member 47 made of braided wire or metal foil disposed outside of the insulator, and a sheath 48 (cover) disposed outside of the shielding member 47 (the same structure as a well-known shielded wire). At the one end of the high voltage cable 42, the shielding member 47 is folded back on the sheath 48, and the center conductor 46 is exposed and extended straight in a specific length.

The center conductor 46 may be made of twisted element wires, a bar-shaped conductor having a rectangular section or a circular section or the like (for example, later-described rectangular conductor 78). The connecting member 43 is connected to the center conductor 46.

The connecting member 43 is electrically connected to the junction block 31 (mating object), and a tip end of the connecting member 43 is formed in a substantially tabular shape. The connecting member 43 includes: an electric contact part 49 disposed at the tip end; a wire connecting part 50 connected to the center conductor 46 by, for example, pressure bonding; and an intermediate part 51 connecting the electric contact part 49 and the wire connecting part 50. The electric contact part 49 is folded perpendicular to the intermediate part 51. A whole of the connecting member 43 is formed in substantially an L-shape. The connecting member 43 is electrically connected to the junction block 31 in a vertical direction shown by an arrow V.

The shielding member 47 contacts the terminal fixing member 45, and provides a body earth to a floor panel 33 via the terminal fixing member 45. Incidentally, regarding the shield function, the present invention is not limited to the shielded wire, but a shielding member (braided wire or metal foil) covering the plurality of high voltage cable in a lump. A cabtyre cable may be used as the high voltage cable. Alternatively, a later-described wiring harness main body 74 according to a second embodiment may be used.

The terminal fixing member 45 arranges and fixes the terminals of the high voltage cables 42 and the connecting member 43 to a specific position of the underfloor 34, and is made of conductive metal according to this embodiment. The terminal fixing member 45 is so formed as to arrange the terminals of the high voltage cables 42 around the through-hole 35, and arrange the connecting member 43 at the position of the through-hole 35. The terminal fixing member 45 according to this embodiment includes: a case 52; a tube 53 and a fixing flange 54 continued from the case 52.

The case 52 has an opening 56 on an upper wall 55, and the tube 53 is coupled to a side wall 57 so as to communicate with an inside of the case 52. The fixing flange 54 is formed on the other side wall 58 at a height of the upper wall 55. The fixing flange 54 is fixed to the underfloor 34 with a bolt 59. At least two fixing flanges 54 are provided on the case 52. The upper wall 55 contacts the underfloor 34 to provide a body earth.

A bottom wall 60 of the case 52 is formed flat and parallel to the underfloor 34. When the terminal fixing member 45 is fixed to the underfloor 34, the tube 53 is also arranged parallel to the underfloor 34. Because the underfloor 34 is arranged along a horizontal direction shown by an arrow P, the tube 53 is extended in the horizontal direction.

When the high voltage cable 42 of which terminal the connecting member 43 is connected to is attached to the terminal fixing member 45, the shielding member 47 contacts the tube 53 (a shape of the tube 53 is not limited as long as the shielding member 47 contacts the tube 53). While the shielding member 47' contacts the tube 53, the sheath 48 (cover) of the high voltage cable 42 is arranged parallel to the underfloor 34.

After the terminal fixing member 45 is attached to the connecting member 43, the connecting member 43 received in the case 52 is fixed to a housing 61 made of insulating synthetic resin. A connector fitting part 62 projected upward from the opening 56 of the upper wall 55 is formed on the housing 61. The electric contact part 49 of the connecting member 43 is exposed to an inner space of the connector fitting part 62. This part of the terminal fixing member 45 works as a connector 63 by forming the housing 61.

Incidentally, a method for producing the housing 61 is not limited specifically. For example, a synthetic-resin-made sub housing is integrally formed with the connecting member 43, then, a gap between the sub housing and an inner wall of the case 52 is filled with the resin by such as potting.

A packing 64 is provided on the housing 61 around the through-hole 35 on the floor panel 33. The packing 64 closely attached to the underfloor 34 surrounding the through-hole 35 to prevent water from entering the cabin 6.

If it is difficult to insert the connecting member 43 into the terminal fixing member 45, a shape of the terminal fixing member 45 is not limited to a shape shown in figures. As long as the terminal fixing member 45 can contact the shielding member 47, the shape of the terminal fixing member 45 including the tube 53 can be changed properly (however, a shape projected largely to the ground is not preferable).

The wire protecting member 44 is a tubular member having a circular section or an oval section for inserting and covering a protected object part of the plurality of high voltage cables 42 in a lump. In this embodiment, the wire protecting member 44 is composed of a long bendable standard pipe. If a plurality of protected object parts exists, a plurality of long standard pipes is arranged in the wiring harness 41. The protected object part is not limited to a main line, but a branch line.

There is no need for the long standard pipe as one example of the wire protecting member 44 to have a shielding function because the plurality of high voltage cables 42 are shielded wires, and is made of synthetic resin. Incidentally, when a whole or a part of the wire protecting member 44 is arranged near a heat source, the long standard pipe may be made of metal having heat resisting property. The wire protecting member 44 may be bendable after inserting and protecting the high voltage cables 42. Alternatively, the wire protecting member 44 may be bent before inserting the high voltage cables 42. The bending process depends on the wiring route.

A not-shown fixing part is provided on the wire protecting member 44. The fixing part of this embodiment is a pipe specialized clamp, and includes: a wrap part wrapping around an outer periphery of the wire protecting member 44; and a screw fixing part for fixing the underfloor 34 (or a portion on which the wiring harness 41 can be arranged such as reinforcement) of the floor panel 33 with a screw. The fixing part may be formed by a band or a clip other than the pipe specialized clamp.

One end of the wire protecting member 44 is attached to an outer surface of the tube 53 of the terminal fixing member 45. The reference sign 65 indicates a retaining member for preventing the wire protecting member 44 from falling out. One example of the retaining member 65 is a wrapping and fixing part such as a band.

Here, a case that the wire protecting member 44 is made of metal will be explained. When the wire protecting member 44 is made of metal, the protecting property is improved than that made of synthetic resin. In view of the protecting property and the antiweatherability, stainless-steel can be a material for the wire protecting member 44. Further, in view of the protecting property and the weight saving, aluminum is also preferable. In this explanation, the material is aluminum. There is no need for the wire protecting member 44 to have a shielding function. This is because the high voltage cable 42 has the shielding function, and the wire protecting member 44 can be a simple structure. For example, in the hybrid vehicle 21, high shielding property is needed. If the wire protecting member 44 is a metallic pipe, and has a shielding function, the metallic pipe should wrap the electric wire (non-shielded wire) completely without any gap. Alternatively, if the metallic pipe cannot wrap the electric wire completely, the metallic pipe should provide a body earth.

In this explanation, the reason why the wire protecting member 44 is made of aluminum is because it is a good example that the wire protecting member 44 has no shielding function other than the advantage of the protecting property and the weight saving. Namely, when aluminum is oxidized, aluminum oxide which is an insulator is made, thereby it is difficult for aluminum to have the shielding function. It is well-known that resistivity of a surface of aluminum becomes very large due to temporal change. Therefore, it is difficult to make a structure to provide a body earth without a special treatment. Incidentally, it is difficult to provide high shielding property for a structure having many gaps, for example, simply pulling out the high voltage cable 42 from the pipe end, even when the wire protecting member 44 is conductive.

In the above structure, the wiring arrangement of the wiring harness 41 at the underfloor 34 includes the steps of: aligning the connecting member 43 to the position of the through-hole 35; arranging the sheath 48 (cover) along the underfloor 34 and parallel to the underfloor 34 while received in the wire protecting member 44; and fixing the terminal fixing member 45 and the wire protecting member 44 to the underfloor 34. After such a wiring arrangement, the wiring harness 41 is electrically connected to the junction block 31 (mating object, electrical junction box) around the through-hole 35 by mounting the battery 25.

Incidentally, the other end of the high voltage cable 42, namely, the connection at the engine room 26 side is not limited specifically. Further, the high voltage cables 42 and the ends of the high voltage cables 42 are arranged perpendicular to the paper surface of FIG. 1.

As explained above with reference to FIG. 1, according to the present invention, a wiring structure of the wiring harness 41 in which there is no need to arrange the high voltage cable 42 in the cabin 27 above the floor panel 33 is provided. According to the above, compared with a conventional example, the wiring structure of the wiring harness is able to increase workability, save space, and reduce cost. Further, according to the present invention, because the high voltage cable 42 is not arranged above the floor panel 33, there is no need to bend the high voltage cable 42 at the position of the through-hole 35, and the wiring harness can be arranged farther away from the ground as much as possible. (Thereby, the wiring harness can be low profile.)

Further, according to the present invention, because the sheath 48 (cover) of the wiring harness 41 is arranged parallel to the underfloor 34, the distance from the ground is secured enough. Further, according to the present invention, because the high voltage cable 42 is not arranged above the floor panel 33, there is no need to insert the wiring harness 41 into the through-hole 35, and a relatively short wiring harness 41 can be used.

Further, according to the present invention, when the wiring harness 41 is arranged at the underfloor 34, the connecting member 43 aligned to the position of the through-hole 35 and the junction block 31 in the cabin 27 on the floor panel 33 are electrically connected to each other. Further, connecting workability is improved.

Further, according to the present invention, because the high voltage cable 42 has a shielding function, there is no need for the wiring harness 41 to have a special component for shielding. Further, according to the present invention, because the high voltage cable 42 has a shielding function, the wiring harness 41 has a high shielding function.

Further, according to the present invention, because the high voltage cables 42 are arranged on the underfloor 34, the distance between the high voltage cables 42 and the ground is secured enough even the number of the high voltage cable 42 is not small. Further, according to the present invention, because the packing 64 is provided on the housing 61, the water is prevented from entering the cabin 27 via the through-hole 35 on the floor panel 33. The packing 64 is smaller than a grommet as a waterproof component, resultingly, a small waterproof structure can be realized at low cost.

Second Embodiment

Figure 2:
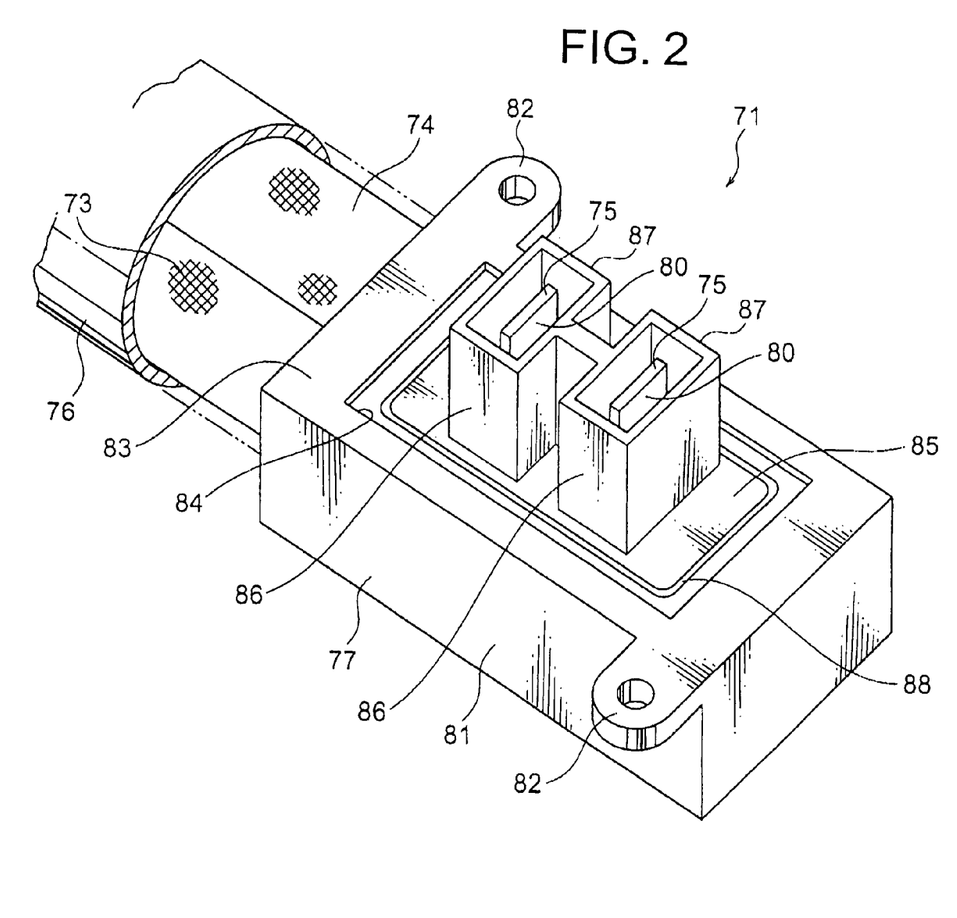
FIG. 2 is a perspective view showing a terminal of the wiring harness according to a second embodiment of the present invention.
Figure 3:
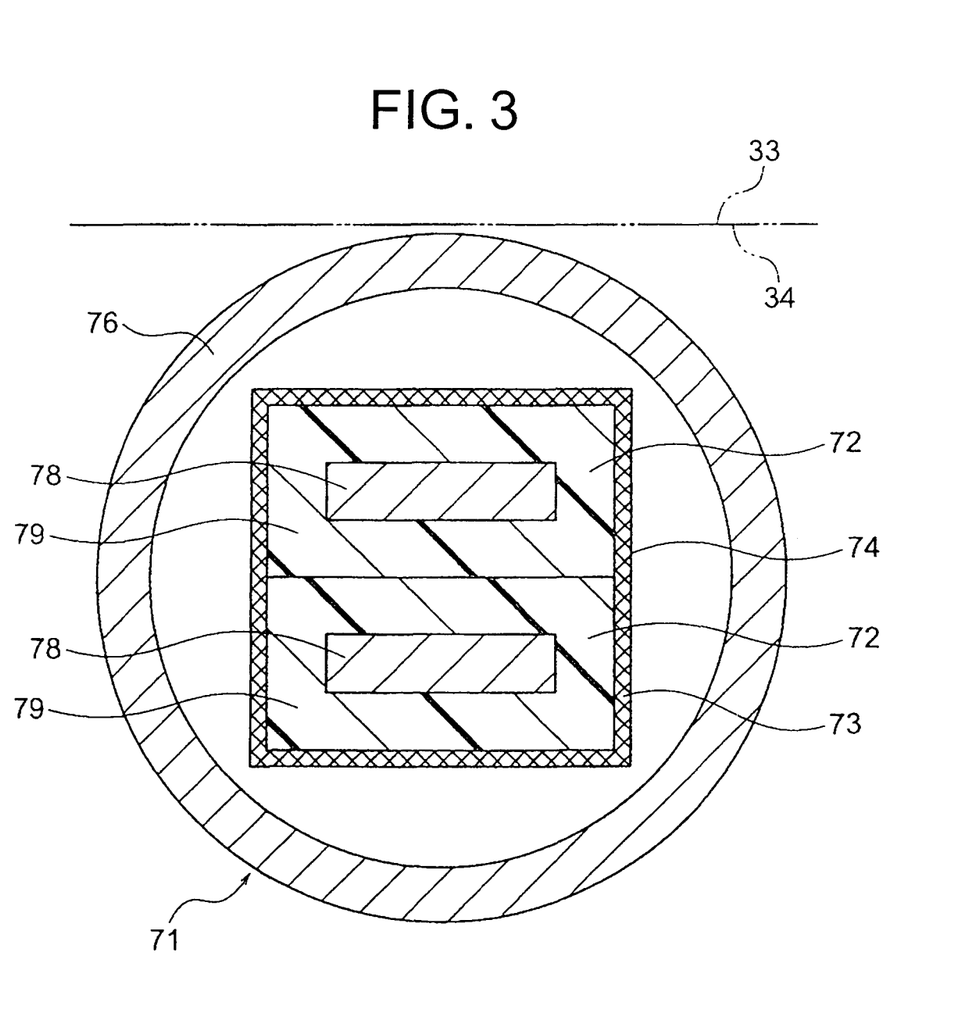
FIG. 3 is a sectional view showing the high voltage cable of FIG. 2 and a wire protecting member.

Hereinafter, a second embodiment of the present invention will be explained with reference to figures. FIG. 2 is a perspective view showing a terminal of the wiring harness according to a second embodiment of the present invention. FIG. 3 is a sectional view showing the high voltage cable of FIG. 2 and a wire protecting member. A wiring harness 71 explained below can be arranged on the hybrid vehicle 21 (see FIG. 1) instead of the wiring harness 41 according to the first embodiment.

In FIGS. 2 and 3, the wiring harness 71 is arranged from the engine room 26 shown in FIG. 1 to the underfloor 34. The wiring harness 71 is characterized in particular by arranging at the underfloor 34. The wiring harness 71 includes: a harness main body 74 having two high voltage cables 72 and shielding member 73; two connecting members 75 provided at one end of the harness main body 74 and electrically connecting the junction block 31 (see FIG. 1); a wire protecting member 76 for inserting and protecting protected object parts of the harness main body 74 in a lump; and a terminal fixing member 77 made of conductive metal.

In FIG. 3, each high voltage cable 72 includes: a rectangular conductor 78 having a rectangular cross section; and an insulator 79 covering an outside of the rectangular conductor 78. The rectangular conductor 78 is a bar-shaped center conductor, and made of copper, copper alloy, or aluminum. These two high voltage cables 72 have substantially a square section by overlapping with each other as shown in FIG. 3. The shielding member 73 is made of a braided wire or a metal foil, and disposed at an outside of the two high voltage cables 72 having substantially the square section.

The harness main body 74 is formed in substantially a square section. The substantially square section of the harness main body 74 has a merit that when the wire protecting member 76 is formed in a circular section, a diameter of the wire protecting member 76 can be small. The shielding member 73 contacts the terminal fixing member 77 and provides a body earth to the floor panel 33 via the terminal fixing member 77.

In FIG. 2, each connecting member 75 is formed in an L-shape similar to the first embodiment, and includes: an electric contact part 80; a wire connecting part; and an intermediate part similar to the first embodiment. As can be expected from an arrangement of two high voltage cables 72, the connecting member 75 of the rectangular conductor 78 nearer the floor panel 33 (underfloor 34) is shorter.

The wire protecting member 76 is a tubular member having a circular section for inserting and protecting the protected object parts of the harness main body 74 in a lump, and according to this embodiment, made of a bendable long standard pipe. Because the harness main body 74 has a shielding function, there is no need for the wire protecting member 76 to have the shielding function, and for example, the wire protecting member 76 is made of aluminum.

A not-shown fixing part is provided on the wire protecting member 76. The fixing part according to this embodiment is a pipe specialized clamp, and includes: a wrapping part for wrapping around an outer periphery of the wire protecting member 76; and a screw fixing part for fixing to the underfloor 34 of the floor panel 33 (or a portion on which the wiring harness 71 can be arranged such as reinforcement) with a screw. Incidentally, the present invention is not limited to the pipe specialized clamp, and a band or a clip may be used as the fixing part. The structure of the terminal is similar to that of the first embodiment, and an explanation is omitted here.

In FIG. 2, the terminal fixing member 77 fixes the terminal of the harness main body 74 and the connecting member 75 to the underfloor 34 (see FIGS. 3 and 1) while arranging at specific positions, and according to this embodiment, the terminal fixing member 77 is made of conductive metal. A shape of the terminal fixing member 77 is so formed as to allow the terminal of the harness main body 74 to be disposed around the through-hole 35 of the floor panel 33 (see FIG. 1), and allow the connecting member 75 to be disposed at the position of the through-hole 35. The terminal fixing member 77 according to this embodiment includes: a case 81; a not-shown tube continued to the case 81; and a fixing flange 82. The structure of the terminal fixing member 77 is similar to the structure of the terminal fixing member 45 according to the first embodiment.

The case 81 has an opening 84 on an upper wall 83. The fixing flange 82 is coupled to the case 81 at a height of the upper wall 83. The fixing flange 82 is fixed to the underfloor 34 with the bolt 59 (see FIG. 1). The upper wall 83 contacts the underfloor 34 (see FIGS. 3 and 1) to provide a body earth.

The shielding member 73 of the harness main body 74 of which terminal is connected to the connecting member 75 contacts the not-shown tube. While the shielding member 73 contacts the not-shown tube, the harness main body 74 is arranged parallel to the underfloor 34.

After the terminal fixing member 77 is attached to the connecting member 75, the connecting member 75 received in the case 81 is fixed to a housing 85 made of insulating synthetic resin. A connector fitting part 86 projected upward from the opening 84 of the upper wall 83 is formed on the housing 85. The electric contact part 80 of the connecting member 75 is exposed to an inner space of the connector fitting part 86. This part of the terminal fixing member 77 works as a connector 87 by forming the housing 85.

A packing 88 is provided on the housing 85 around the through-hole 35 (see FIG. 1) on the floor panel 33. The packing 88 closely attached to the underfloor 34 (see FIG. 1) surrounding the through-hole 35 to prevent water from entering the cabin 6.

If it is difficult to insert the connecting member 75 into the terminal fixing member 77, a shape of the terminal fixing member 77 is not limited to a shape shown in figures. As long as the terminal fixing member 77 can contact the shielding member 73, the shape of the terminal fixing member 77 including the not-shown tube can be changed properly (however, a shape projected largely to the ground is not preferable).

In the above structure, the wiring arrangement of the wiring harness 71 at the underfloor 34 (see FIG. 1) includes the steps of: aligning the connecting member 75 to the position of the through-hole 35 (see FIG. 1); arranging the harness main body 74 along the underfloor 34 and parallel to the underfloor 34 while received in the wire protecting member 76; and fixing the terminal fixing member 77 and the wire protecting member 76 to the underfloor 34. After such a wiring arrangement, the wiring harness 71 is electrically connected to the junction block 31 (mating object) around the through-hole 35 by mounting the battery 25 shown in FIG. 1.

The wiring harness 71 and the wiring structure of the wiring harness 71 have the same effects as the first embodiment, and an explanation is omitted here.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

For example, in this embodiment, the wiring harness 71 is connected to the junction block 31. However, the present invention is not limited to this. The wiring harness 71 may be connected to the battery 25, an intermediate member interposed between the wiring harness 71 and the battery 25, or another wiring harness interposed between the wiring harness 71 and the battery 25.

What is claimed is:

1. A method of providing a wiring structure of a wiring harness arranged on an underfloor at a ground side of a floor panel of a vehicle comprising the steps of:
   providing a wiring harness having one or a plurality of high voltage cables, and a connecting member formed in substantially an L-shape and provided at one end of the high voltage cable and electrically connected to a mating object;
   connectably forming the connecting member which is perpendicular to an extending direction of a cover of the high voltage cable at the one end;
   forming a through-hole communicating an inside and an outside of the vehicle disposed at a specific position on the floor panel; then
   aligning the connecting member through the through-hole;
   arranging the cover at the one end parallel to the underfloor; and
   providing a wire protecting member and a retaining member for preventing the wire protecting member from falling out.

2. The method of providing a wiring structure of a wiring harness as claimed in claim 1,
   wherein the one or the plurality of high voltage cables are composed as shielded electric wires, or a shielding member covering the one or the plurality of high voltage cables in a lump is integrally formed at an outside of the one or the plurality of high voltage cables.

3. The method of providing a wiring structure of a wiring harness as claimed in claim 2,
   wherein a specific shielding part of the one or the plurality of high voltage cables or the shielding member directly or indirectly provides a body earth with respect to the underfloor.

4. The method of providing a wiring structure of a wiring harness as claimed in claim 1,
   wherein the wiring harness further includes a tubular wire protecting member receiving the one or the plurality of high voltage cables, and the wire protecting member is arranged along the underfloor and fixed.

5. The method of providing a wiring structure of a wiring harness as claimed in claim 1,
   wherein the wiring harness is fixed watertightly to a periphery of the through-hole.

6. A wiring harness arranged on an underfloor at a ground side of a floor panel of a vehicle comprising:
   one or a plurality of high voltage cables;
   a connecting member formed in substantially an L-shape and provided at one end of the high voltage cable and electrically connected to a mating object;
   a wire protecting member; and
   a retaining member,
   wherein the retaining member prevents the wire protecting member from falling out, and
   wherein the connecting member is connectably formed perpendicular to an extending direction of a cover of the high voltage cable at the one end and is aligned through a through-hole and is aligned through a through-hole.

* * * * *